(12) United States Patent
Wang et al.

(10) Patent No.: US 11,214,203 B2
(45) Date of Patent: Jan. 4, 2022

(54) URGING DEVICE BETWEEN BICYCLE RACK AND VEHICLE RECEIVER TUBE

(71) Applicants: Chiu Kuei Wang, Taichung (TW); Hugues Espesset, Taichung (TW); Frederic Girod, Taichung (TW)

(72) Inventors: Chiu Kuei Wang, Taichung (TW); Hugues Espesset, Taichung (TW); Frederic Girod, Taichung (TW)

(73) Assignee: KING RACK INDUSTRIAL CO., LTD., Taichung (TW)

(*) Notice: Subject to any disclaimer, the term of this patent is extended or adjusted under 35 U.S.C. 154(b) by 0 days.

(21) Appl. No.: 17/039,378

(22) Filed: Sep. 30, 2020

(65) Prior Publication Data

US 2021/0370841 A1 Dec. 2, 2021

(30) Foreign Application Priority Data

May 29, 2020 (TW) ................................ 109118133

(51) Int. Cl.
*B60R 9/10* (2006.01)
*B60R 9/06* (2006.01)

(52) U.S. Cl.
CPC . *B60R 9/10* (2013.01); *B60R 9/06* (2013.01)

(58) Field of Classification Search
CPC .. B60R 9/10; B60R 9/06; B60D 1/241; B60D 1/52
USPC ......... 224/519; 280/504, 506, 507, 511, 495
See application file for complete search history.

(56) References Cited

U.S. PATENT DOCUMENTS

| | | | | |
|---|---|---|---|---|
| 7,338,065 B1* | 3/2008 | Clausen | ................. | B60D 1/241 280/505 |
| 8,226,107 B2* | 7/2012 | Columbia | ................ | B60D 1/07 280/511 |
| 8,308,185 B2* | 11/2012 | Weaver | ................. | B60D 1/241 280/506 |
| 8,596,664 B2* | 12/2013 | Lahn | ........................ | B60D 1/52 280/506 |
| 8,696,011 B2* | 4/2014 | Despres | ................... | B60D 1/06 280/478.1 |
| 9,242,521 B2* | 1/2016 | Columbia | ................ | B60D 1/52 |
| 9,663,040 B1* | 5/2017 | Shen | ........................ | B60R 9/06 |
| 10,647,263 B2* | 5/2020 | Viklund | ................... | B60R 9/10 |
| 10,793,079 B1* | 10/2020 | Shen | ........................ | B60R 9/06 |
| 10,800,218 B2* | 10/2020 | Columbia | ................ | B60D 1/60 |
| 2009/0189369 A1* | 7/2009 | Thomas | ................... | B60D 1/60 280/507 |

(Continued)

*Primary Examiner* — Nathan J Newhouse
*Assistant Examiner* — Lester L Vanterpool
(74) *Attorney, Agent, or Firm* — Che-Yang Chen; Law Office of Michael Chen

(57) ABSTRACT

An urging device for a bicycle rack and a vehicle receiver tube is located in the connection tube of the bicycle rack which includes two openings formed through a corner of the rectangular cross section of the connection tube. The vehicle receiver tube is mounted to the connection tube. The urging device includes a body which includes two slots, and two cams are located in the two slots and partially protrude through the two slots respectively. A bolt threads through the receiver tube, the connection tube, and threadedly extends through the body and the block. When the bolt rotates, the block moves to push the body, and the two cams contact against inside of the receiver tube to secure the connection between the connection tube and the receiver tube.

4 Claims, 7 Drawing Sheets

(56) References Cited

U.S. PATENT DOCUMENTS

2014/0327228 A1* 11/2014 Laurer .................. B60D 1/241
                                                          280/506

* cited by examiner

URGING DEVICE BETWEEN BICYCLE RACK AND VEHICLE RECEIVER TUBE

BACKGROUND OF THE INVENTION

1. Fields of the Invention

The present invention relates to an urging device for obtaining jiggle-free connection between a connection tube of a bicycle rack and the vehicle receiver tube.

2. Descriptions of Related Art

The conventional way to secure the connection between the connection tube of a bicycle rack and the vehicle receiver tube is to use a bolt which transversely extends through the connection tube of the bicycle rack and the vehicle receiver tube. However, the connection tube of a bicycle rack is inserted into the vehicle receiver tube so that there is a significant gap formed between the two tubes so that the bicycle rack shakes during transportation. The bolt tends to be loosened and may even drop from the two tubes. In addition, the shaking of the bolt may damage the two tubes.

The present invention intends to provide an urging device that is located in the connection tube of the bicycle rack and includes two cams to contact against the inside of the vehicle receiver tube so as to secure the connection between the two tubes.

SUMMARY OF THE INVENTION

The present invention relates to an urging device for a bicycle rack and a vehicle receiver tube, and the urging device comprises a connection tube of the bicycle rack, and the connection tube is a tube having a rectangular cross section. The connection tube includes two openings formed through a corner of the rectangular cross section of the connection tube and located lengthwise of the connection tube. A first hole is defined through the connection tube and located between the two openings. The vehicle receiver tube is mounted to the distal end of the connection tube, and includes a second hole which is located corresponding to the first hole of the connection tube. A bolt extends through the second hole and the first hole.

The urging device includes a body which includes two slots, and two cams are located in the two slots and partially protrude through the two slots respectively. The body includes a third hole. A block is connected to the body and located corresponding to the third hole. The bolt threadedly extends through the body and the block such that when the bolt rotates, the block moves to push the body, and the two cams contact against inside of the receiver tube.

Preferably, the body includes a face that contacts against the inside of the connection tube when the bolt rotates and the cams contact against the inside of the receiver tube.

Preferably, the body includes a recess which includes a curved inside. The block is movably located in the recess and movable along the curved inside to move the body.

Preferably, the body includes four sides which includes a first face and a second face. An edge line is formed between the first and second faces. The two cams are pivotably connected to the body by a pin. The two cams protrude through the edge line between the first and second faces.

The primary object of the present invention is to provide an urging device for a bicycle rack and a vehicle receiver tube so that the bicycle rack does not shake due to the secure connection between the connection tube of the bicycle rack and the vehicle receiver tube.

Another object of the present invention is that the urging device can be easily installed to the existed bicycle rack by minor machining processes.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
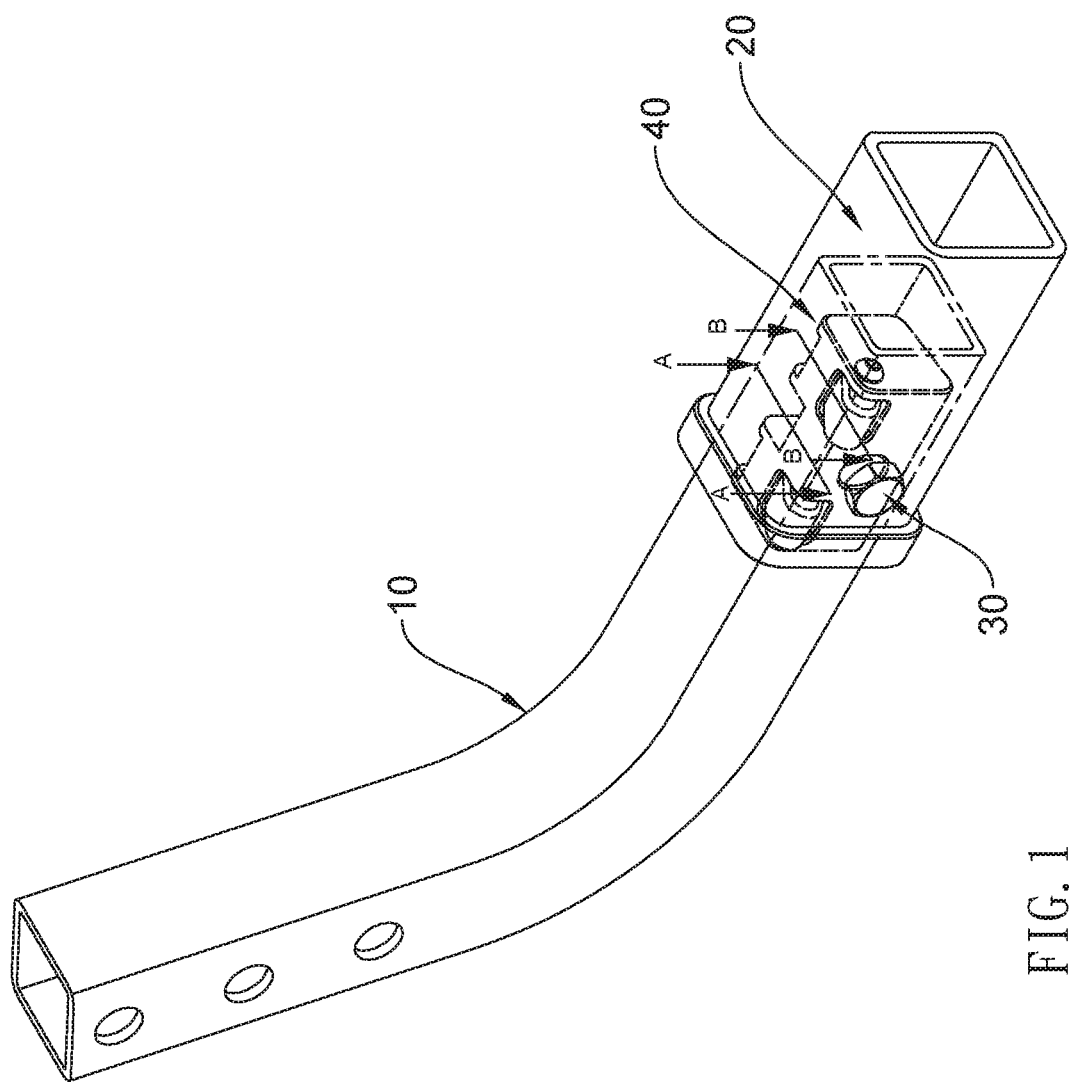
FIG. 1 is an exploded view to show the urging device of the present invention to secure the secure connection between the connection tube of the bicycle rack and the vehicle receiver tube.
Figure 2:
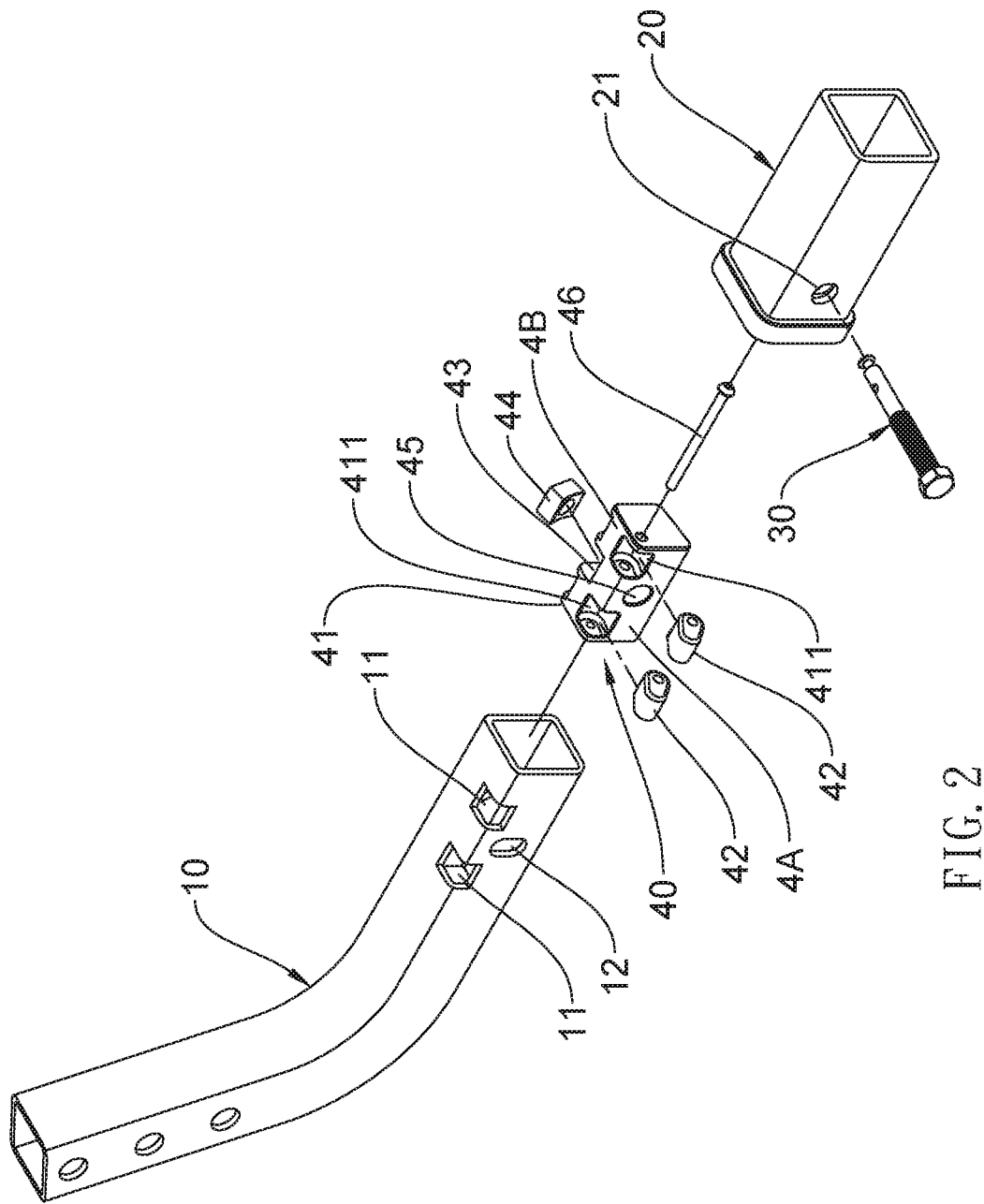
FIG. 2 is an exploded view to show the urging device of the present invention.
Figure 3:
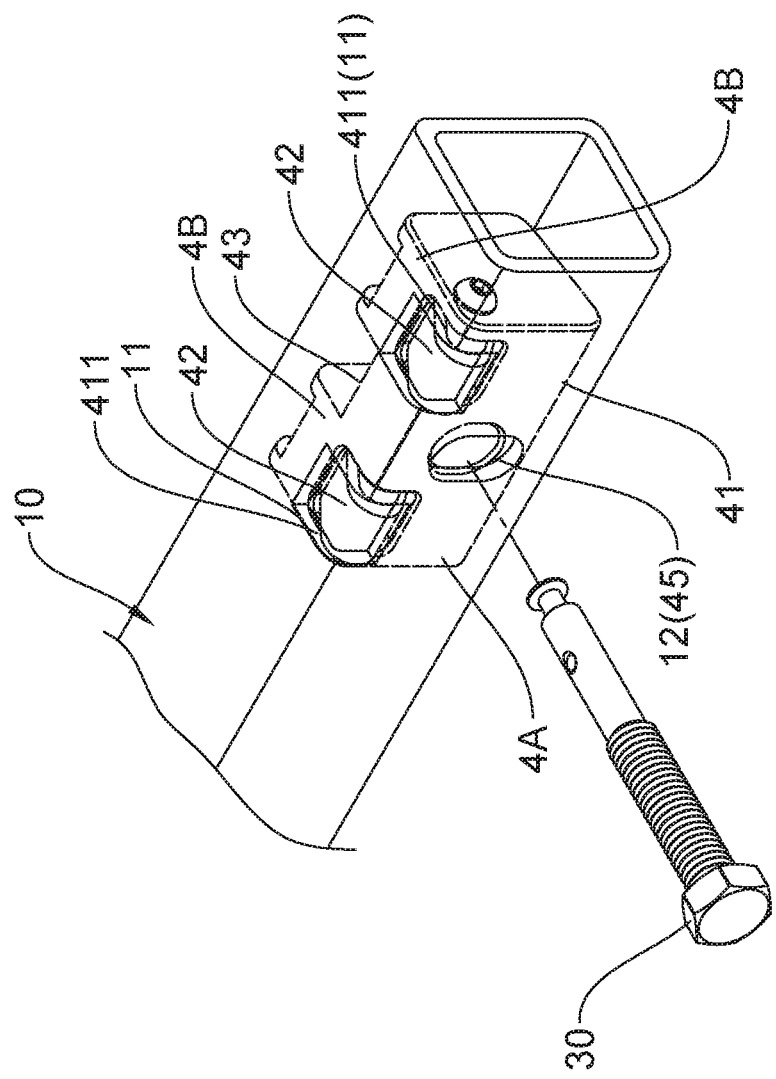
FIG. 3 shows that a bolt is to be threadedly extended through the urging device of the present invention.

Referring to FIGS. 1, 2, 3 and 4A and 4B, the urging device of the present invention is used to secure the connection between the connection tube 10 of a bicycle rack (not shown) and the vehicle receiver tube 20.

The connection tube 10 of the bicycle rack is a tube that includes a rectangular cross section. Two openings 11 are formed through the corner of the rectangular cross section of the connection tube 10 and located lengthwise of the connection tube 10. A first hole 12 is defined through the connection tube 10 and located between the two openings 11.

The vehicle receiver tube 20 is mounted to the distal end of the connection tube 10 and includes a second hole 21 which is located corresponding to the first hole 12 of the connection tube 10. A bolt 30 extends through the second hole 21 and the first hole 12 to connect the connection tube 10 and the receiver tube 20.

The urging device 40 includes a body 41 which is an elongate body and includes four sides which includes a first face 4A and a second face 4B, wherein an edge line is formed between the first and second faces 4A, 4B. Two slots 411 are formed along the edge line. Two cams 42 are pivotably connected to the body 41 by a pin 46 and located in the two slots 411. The two cams 42 partially protrude beyond the two slots 411 and extend through the edge line between the first and second faces 4A, 4B. The body 41 includes a third hole 45 which is located corresponding to the first and second holes 12, 21. The body 41 includes a recess 43 which includes a curved inside and located corresponding to the third hole 45. A block 44 is movably located in the recess 43 and movable along the curved inside to move the body 41.

The bolt 30 threadedly extends through the body 41 and the block 44 such that when the bolt 30 rotates, the block 44 moves to push the body 41, and the two cams 42 contact against inside of the receiver tube 20. It is noted that the body 41 includes a face that contacts against an inside of the connection tube 10 when the bolt 30 rotates and the cams 42 contact against the inside of the receiver tube 20.

Figure 4A:
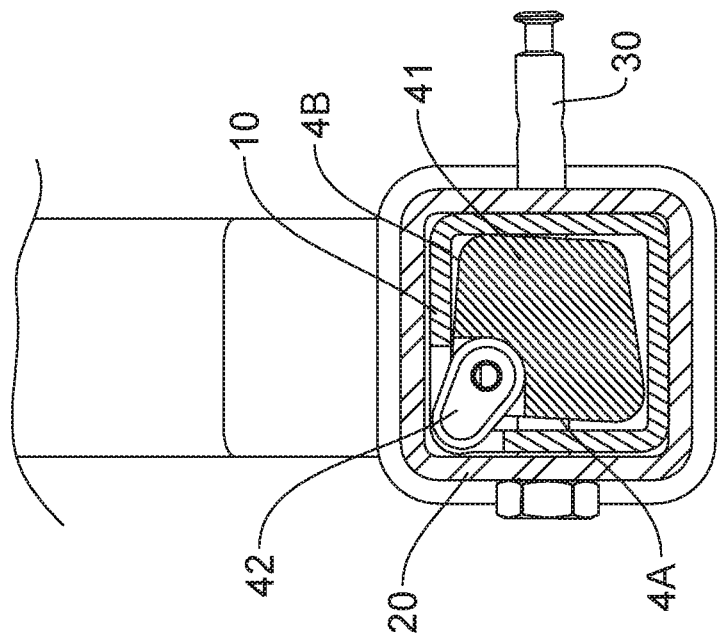
FIG. 4A and FIG. 4B show two respective cross sectional views along lines A-A and B-B in FIG. 1.
Figure 4B:
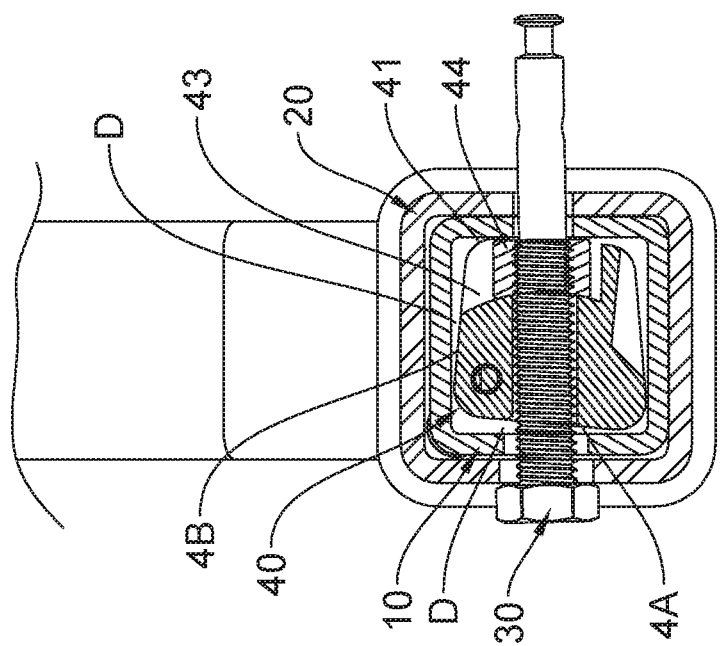

When in use, as shown in FIGS. 4A and 4B, the bolt 30 is not in locked status, and the first and second faces 4A, 4B are not in contact with the inside of the connection tube 10 so that a gap "D" is formed between the inside of the connection tube 10 and each of the first and second faces 4A, 4B.

Figure 5A:
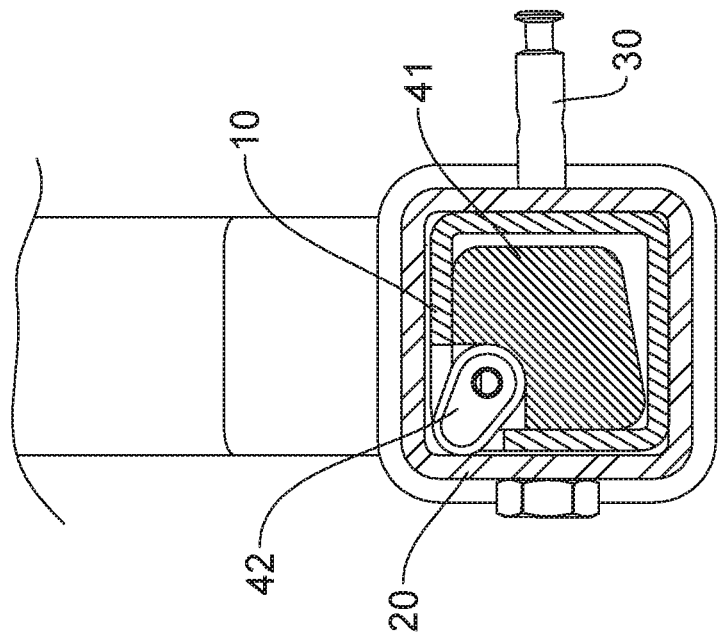
FIG. 5A and FIG. 5B show that the bolt is rotated to move the body in the connection tube, and the two cams contact the inside of the receiver tube.
Figure 5B:
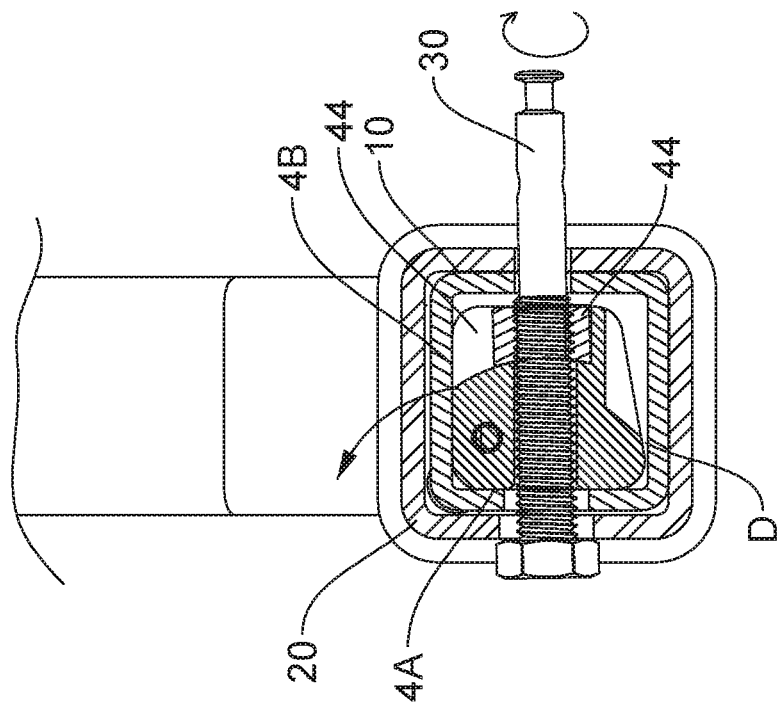

As shown in FIGS. 5A and 5B, when rotating the bolt 30 by a tool, the block 44 is movable along the curved inside to move the body 41 so that the first and second faces 4A, 4B move toward and contact the inside of the connection tube 10. The two cams 42 contact the inside of the receiver tube 20.

Figure 6B:
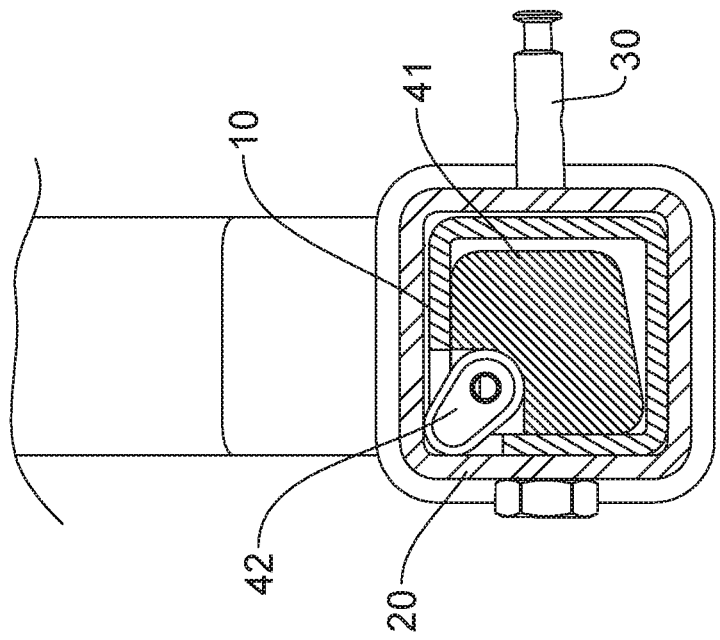
FIG. 6A and FIG. 6B show that the bolt is continuously rotated, and the first and second faces of the body contact inside of the connection tube, and the two cams fully contact the inside of the receiver tube.
Figure 6A:
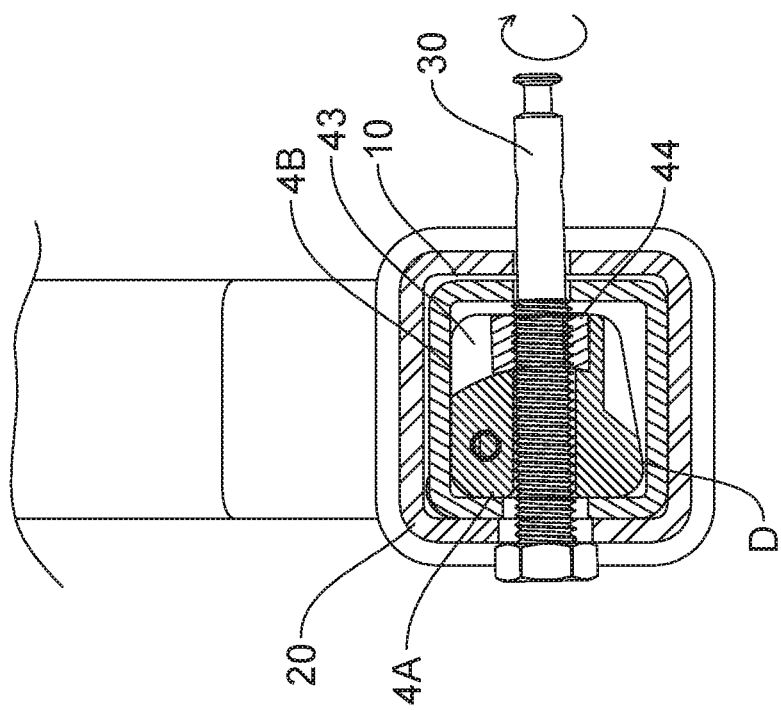

As shown in FIGS. 6A, 6B, when the bolt 30 is continuously rotated, the first and second faces 4A, 4B contact against the inside of the connection tube 10. A gap "D" is still formed at the lower face of the body 41 and the inside of the connection tube 10 as shown in FIG. 6A. As shown in FIG. 6B, each of the cams 42 contacts at least two points of the inside of the receiver tube 20.

Figure 7A:
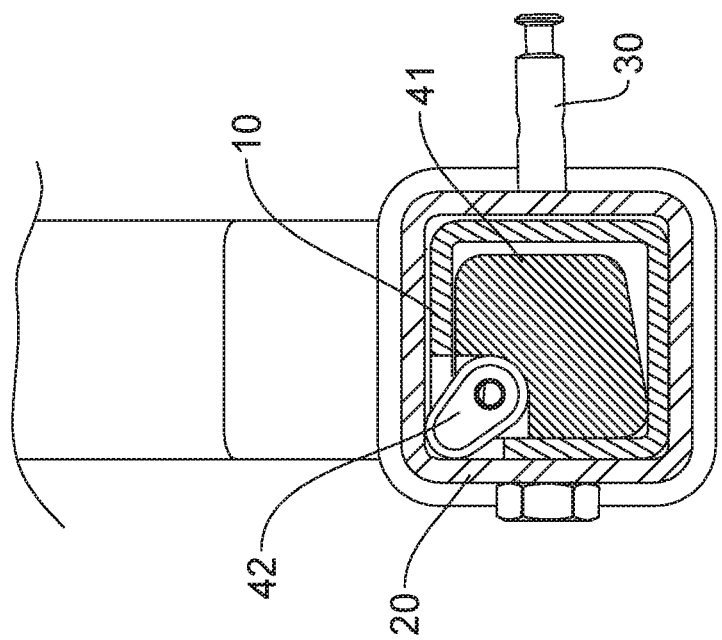
FIG. 7A and FIG. 7B show that the bolt is rotated to its locked status, and the first and second faces of the body contact against the inside of the connection tube, and the two cams fully contact against the inside of the receiver tube.
Figure 7B:
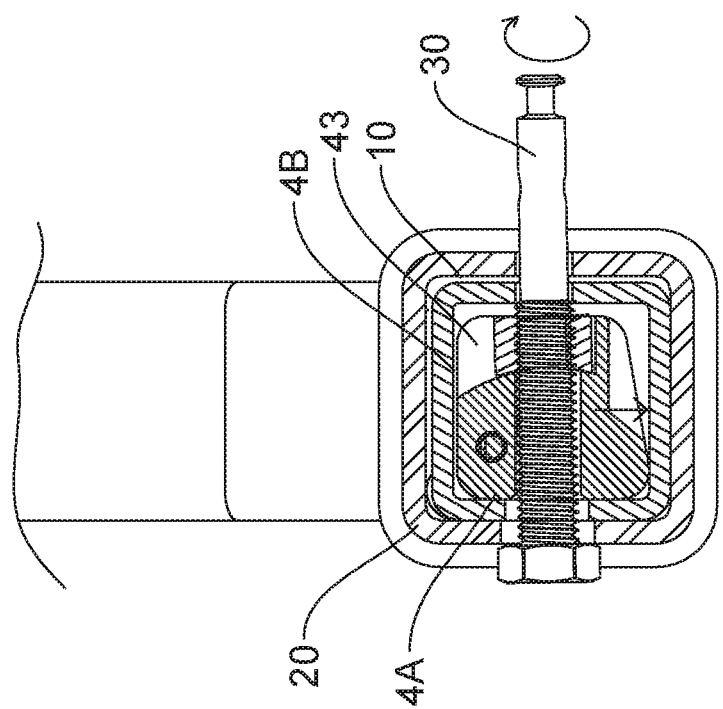

As shown in FIGS. 7A, 7B, when the bolt 30 is in locked status, the gap "D" between the lower face of the body 41 and the inside of the connection tube 10 as shown in FIG. 6A disappears as shown in FIG. 7A. Therefore, the body 41 has three faces contacting against the inside of the receiver tube 20. It is noted that there are multiple contact points between the body 41 and the inside of the connection tube 10, and there are two contact points between the cams 42 and the inside of the receiver tube 20. By this urging device of the present invention, the bicycle rack does not shake.

While we have shown and described the embodiment in accordance with the present invention, it should be clear to those skilled in the art that further embodiments may be made without departing from the scope of the present invention.

What is claimed is:

1. An urging device for a bicycle rack and a vehicle receiver tube, comprising:

a connection tube of the bicycle rack being a tube having a rectangular cross section, the connection tube including two openings formed through a corner of the rectangular cross section of the connection tube and located lengthwise of the connection tube, a first hole defined through the connection tube and located between the two openings;

the vehicle receiver tube mounted to a distal end of the connection tube and including a second hole which is located corresponding to the first hole of the connection tube, a bolt extending through the second hole and the first hole;

the urging device including a body which includes four sides including a first face, a second face and two slots, two cams located in the two slots and partially protruding through the two slots respectively, the body including a third hole, a block connected to the body and located corresponding to the third hole, the bolt threadedly extending through the body and the block, the body including a recess which includes a curved inside, the block movably located in the recess and movable along the curved inside to move the body, and when the bolt is not in a locked status, the first and second faces are not in contact with an inside of the connection tube, and a gap is formed between the inside of the connection tube and each of the first and second faces; when rotating the bolt, the block is movable along the curved inside to move the body, the first and second faces move toward and contact the inside of the connection tube, the two cams contact an inside of the vehicle receiver tube.

2. The urging device as claimed in claim 1, wherein an edge line is formed between the first and second faces, the two cams are pivotably connected to the body by a pin, the two cams protrude through the edge line between the first and second faces.

3. The urging device as claimed in claim 1, when the bolt is continuously rotated, and the first and second faces contact against the inside of the connection tube, another gap is formed at the lower face of the body and the inside of the connection tube, each of the cams contacts at least two points of the inside of the receiver tube.

4. The urging device as claimed in claim 3, when the bolt is in a locked status, said another gap between the lower face of the body and the inside of the connection tube disappears.

* * * * *